United States Patent
Lee et al.

(10) Patent No.: US 10,693,317 B2
(45) Date of Patent: Jun. 23, 2020

(54) SERVER AND HOME APPLIANCE HAVING POWER DEMAND MANAGEMENT FUNCTION AND METHOD OF MANAGING POWER USAGE THEREOF

(71) Applicant: Encored Technologies, Inc., Seoul (KR)

(72) Inventors: Hyoseop Lee, Seoul (KR); Jong-Woong Choe, Seoul (KR)

(73) Assignee: Encored Technologies, Inc., Seoul (KR)

( * ) Notice: Subject to any disclaimer, the term of this patent is extended or adjusted under 35 U.S.C. 154(b) by 53 days.

(21) Appl. No.: 15/857,284

(22) Filed: Dec. 28, 2017

(65) Prior Publication Data

US 2018/0191196 A1    Jul. 5, 2018

(30) Foreign Application Priority Data

Dec. 29, 2016  (KR) .......................... 10-2016-0181779

(51) Int. Cl.
*H02J 3/14*      (2006.01)
*H02J 13/00*    (2006.01)
(Continued)

(52) U.S. Cl.
CPC .......... *H02J 13/0006* (2013.01); *G05B 15/02* (2013.01); *G06Q 20/145* (2013.01);
(Continued)

(58) Field of Classification Search
CPC ...... H02J 13/0006; H02J 13/0079; H02J 3/14; H02J 2003/146; H02J 2003/143;
(Continued)

(56) References Cited

U.S. PATENT DOCUMENTS 5,146,067 A * 9/1992 Sloan ................. G06Q 20/3437
                                                                     235/381
5,696,695 A * 12/1997 Ehlers ................. H02J 13/0086
                                                                     700/286

(Continued)

FOREIGN PATENT DOCUMENTS

KR    10-2013-0046693 A    5/2013
KR    10-2014-0009748 A    1/2014
(Continued)

*Primary Examiner* — Darrin D Dunn
(74) *Attorney, Agent, or Firm* — John H. Choi & Associates (57) ABSTRACT

A power demand management system includes a plurality of power-prepaid appliances and a power demand management server. Each of the power-prepaid appliances includes an authenticator configured to manage an authentication key, a control setting unit configured to receive a power consumption control signal containing a power reduction amount from the power demand management server and to set control information according to the power reduction amount, and an operation control signal generator configured to generate an operation control signal based on the control information selected by the control setting unit. The power demand management server includes a demand resource allocator configured to allocate the power reduction amount to each power-prepaid appliance, a security unit configured to encrypt the power consumption control signal based on the authentication key of each power-prepaid appliance, and a reduction manager configured to monitor a reduction in power consumption depending on the power consumption control signal.

8 Claims, 7 Drawing Sheets

(51) Int. Cl.
| | |
|---|---|
| *G05B 15/02* | (2006.01) |
| *G06Q 20/28* | (2012.01) |
| *H04L 9/30* | (2006.01) |
| *G07F 15/00* | (2006.01) |
| *H04L 9/14* | (2006.01) |
| *G06Q 20/14* | (2012.01) |
| *G06Q 50/06* | (2012.01) |
| *H02J 3/00* | (2006.01) |

(52) U.S. Cl.
CPC .......... *G06Q 20/28* (2013.01); *G07F 15/003* (2013.01); *G07F 15/008* (2013.01); *H02J 3/14* (2013.01); *H02J 13/0079* (2013.01); *H04L 9/14* (2013.01); *H04L 9/30* (2013.01); *G05B 2219/2642* (2013.01); *G06Q 50/06* (2013.01); *G06Q 2220/00* (2013.01); *H02J 3/003* (2020.01); *H02J 2310/14* (2020.01); *H02J 2310/64* (2020.01); *Y02B 70/3225* (2013.01); *Y02B 70/3275* (2013.01); *Y04S 20/222* (2013.01); *Y04S 20/244* (2013.01)

(58) Field of Classification Search
CPC .......... H02J 2003/003; H02J 2300/40; H02J 2310/64; H02J 7/00045; G07F 15/003; G07F 15/008; H04L 9/14; H04L 9/30; H04L 12/14; H04L 12/1453; G05B 15/02; G05B 2219/2642; Y04S 20/244; Y04S 20/222; Y02B 70/3275; Y02B 70/3225; Y02B 90/245; G06Q 20/145; G06Q 20/28; G06Q 50/06; G06Q 2220/00; G06Q 20/40; G06F 1/3234; Y10T 307/832

See application file for complete search history.

(56) References Cited

U.S. PATENT DOCUMENTS

| | | | | |
|---|---|---|---|---|
| 5,774,528 | A * | 6/1998 | Bogner | H04L 12/2825 340/533 |
| 5,924,486 | A * | 7/1999 | Ehlers | G05D 23/1923 165/238 |
| 6,191,501 | B1 * | 2/2001 | Bos | G07F 15/00 307/64 |
| 6,529,883 | B1 * | 3/2003 | Yee | G06Q 20/127 705/63 |
| 6,553,353 | B1 * | 4/2003 | Littlejohn | G06Q 20/127 705/412 |
| 6,828,695 | B1 * | 12/2004 | Hansen | G01R 22/066 307/31 |
| 6,988,025 | B2 * | 1/2006 | Ransom | G05B 19/4185 700/295 |
| 6,990,395 | B2 * | 1/2006 | Ransom | G05B 19/4185 700/295 |
| 7,761,910 | B2 * | 7/2010 | Ransom | G06F 1/28 726/6 |
| 8,103,563 | B2 * | 1/2012 | O'Neil | G01D 4/002 705/30 |
| 8,140,414 | B2 * | 3/2012 | O'Neil | G01D 4/004 705/34 |
| 8,207,865 | B2 * | 6/2012 | Kopp | G01D 4/002 340/870.01 |
| 8,234,189 | B2 * | 7/2012 | Taylor | G06Q 20/10 705/34 |
| 9,207,735 | B2 * | 12/2015 | Khaitan | G05B 15/02 |
| 9,263,890 | B2 | 2/2016 | Park et al. | |
| 9,443,267 | B1 * | 9/2016 | Davis | G06Q 50/06 |
| 9,678,896 | B2 * | 6/2017 | O'Loughlin | H04L 9/3066 |
| 9,697,512 | B2 * | 7/2017 | Pitroda | G06Q 20/02 |
| 10,334,702 | B1 * | 6/2019 | Orysh | H03K 17/962 |
| 10,523,050 | B2 * | 12/2019 | Forbes, Jr. | G05B 19/02 |

| | | | | |
|---|---|---|---|---|
| 2001/0010032 | A1 * | 7/2001 | Ehlers | G05B 15/02 702/62 |
| 2004/0193329 | A1 * | 9/2004 | Ransom | H04L 63/20 700/286 |
| 2006/0174102 | A1 * | 8/2006 | Smith | H04W 12/04 713/150 |
| 2007/0083479 | A1 * | 4/2007 | Swartz | G06Q 50/06 705/412 |
| 2008/0019276 | A1 * | 1/2008 | Takatsuji | H04N 5/913 370/236 |
| 2009/0224938 | A1 * | 9/2009 | Kopp | G01D 4/002 340/870.02 |
| 2009/0307117 | A1 * | 12/2009 | Greiner | G06Q 30/04 705/34 |
| 2010/0095107 | A1 * | 4/2010 | Smith | H04L 12/2803 713/150 |
| 2010/0174629 | A1 * | 7/2010 | Taylor | G06Q 20/10 705/34 |
| 2011/0055036 | A1 * | 3/2011 | Helfan | G06O 30/04 705/26.1 |
| 2011/0063126 | A1 * | 3/2011 | Kennedy | G01D 4/002 340/870.02 |
| 2011/0144819 | A1 * | 6/2011 | Andrews | G01D 4/004 700/291 |
| 2011/0196546 | A1 * | 8/2011 | Muller | H02J 3/383 700/295 |
| 2011/0218680 | A1 * | 9/2011 | Kim | H02J 3/00 700/276 |
| 2012/0086546 | A1 * | 4/2012 | Montgomery | H02J 3/14 340/5.1 |
| 2012/0102334 | A1 * | 4/2012 | O'Loughlin | G06F 12/1408 713/189 |
| 2012/0119922 | A1 * | 5/2012 | O'Neil | G01D 4/002 340/870.02 |
| 2012/0136496 | A1 * | 5/2012 | Black | H02J 3/14 700/291 |
| 2012/0150670 | A1 * | 6/2012 | Taylor | G06Q 20/10 705/16 |
| 2012/0259735 | A1 * | 10/2012 | Taylor | G06Q 20/10 705/26.41 |
| 2012/0316693 | A1 * | 12/2012 | Ogawa | H02J 13/0086 700/295 |
| 2013/0015806 | A1 * | 1/2013 | Silbermann | G07F 15/04 320/101 |
| 2013/0024306 | A1 * | 1/2013 | Shah | G06Q 20/32 705/17 |
| 2013/0035802 | A1 * | 2/2013 | Khaitan | H02J 3/383 700/297 |
| 2013/0038468 | A1 * | 2/2013 | Wang | G01D 4/002 340/870.02 |
| 2013/0110970 | A1 * | 5/2013 | Meyerhofer | G06Q 10/0631 709/217 |
| 2013/0138960 | A1 * | 5/2013 | Drucker | H04L 9/083 713/170 |
| 2013/0307694 | A1 * | 11/2013 | Amar | G01D 4/002 340/637 |
| 2013/0346768 | A1 * | 12/2013 | Forbes, Jr. | H04L 41/50 713/310 |
| 2014/0088738 | A1 * | 3/2014 | Kouda | G05B 15/02 700/90 |
| 2014/0088784 | A1 * | 3/2014 | Washiro | G06Q 30/04 700/295 |
| 2014/0180488 | A1 * | 6/2014 | Hirayama | H04L 12/2816 700/295 |
| 2014/0180886 | A1 * | 6/2014 | Forbes, Jr. | B60L 53/305 705/34 |
| 2014/0203933 | A1 * | 7/2014 | Wang | G08B 25/10 340/539.14 |
| 2014/0222234 | A1 * | 8/2014 | Hirayama | H02J 3/14 700/295 |
| 2014/0278687 | A1 * | 9/2014 | McConky | G06Q 10/06312 705/7.22 |
| 2014/0285318 | A1 * | 9/2014 | Audeon | B60L 3/12 340/5.61 |
| 2014/0371942 | A1 * | 12/2014 | Matsuyama | G05F 1/66 700/297 |

(56) References Cited

U.S. PATENT DOCUMENTS

| | | | | |
|---|---|---|---|---|
| 2015/0005968 A1* | 1/2015 | Dorough | G06Q 50/06 | 700/291 |
| 2015/0154499 A1* | 6/2015 | Meyerhofer | G06Q 10/04 | 700/291 |
| 2015/0160675 A1* | 6/2015 | Kim | H04L 12/2803 | 700/276 |
| 2015/0301546 A1* | 10/2015 | Homor | G05B 15/02 | 700/295 |
| 2015/0324817 A1* | 11/2015 | Chen | G06Q 30/0202 | 705/7.31 |
| 2016/0055433 A1* | 2/2016 | Koch | G06Q 50/06 | 705/7.12 |
| 2016/0197478 A1* | 7/2016 | Khaitan | H02J 3/14 | 700/295 |
| 2016/0252944 A1* | 9/2016 | Kim | G06F 1/28 | 713/340 |
| 2016/0359325 A1* | 12/2016 | Kawata | H04L 12/2829 | |
| 2017/0025860 A1* | 1/2017 | Forbes, Jr. | H02J 3/14 | |
| 2017/0069008 A1* | 3/2017 | Wang | G01D 4/002 | |
| 2017/0237289 A1* | 8/2017 | Thompson | G05B 15/02 | 700/296 |
| 2017/0293921 A1* | 10/2017 | McCurnin | G06N 5/04 | |
| 2018/0129788 A1* | 5/2018 | Sitrick | H04N 21/4627 | |
| 2019/0044343 A1* | 2/2019 | Burckard | H02J 4/00 | |
| 2019/0097982 A1* | 3/2019 | Bhattacharyya | H04L 63/0435 | |
| 2019/0149627 A1* | 5/2019 | Zhuang | G06Q 10/06 | 709/224 |
| 2019/0157865 A1* | 5/2019 | Khaitan | H02J 3/32 | |
| 2019/0385248 A1* | 12/2019 | Matsuoka | F24F 11/00 | |
| 2019/0390977 A1* | 12/2019 | Frader-Thompson | G06Q 30/0277 | |
| 2020/0036224 A1* | 1/2020 | Forbes, Jr. | G05B 13/0255 | |

FOREIGN PATENT DOCUMENTS

| | | |
|---|---|---|
| KR | 10-2014-0114665 A | 9/2014 |
| KR | 10-2015-0064771 A | 6/2015 |
| WO | 2014/141354 A1 | 9/2014 |
| WO | 2016/042640 A1 | 3/2016 |

\* cited by examiner

SERVER AND HOME APPLIANCE HAVING POWER DEMAND MANAGEMENT FUNCTION AND METHOD OF MANAGING POWER USAGE THEREOF

CROSS-REFERENCE TO RELATED APPLICATION

This application claims the benefit of Korean Patent Application No. 10-2016-0181779, filed on Dec. 29, 2016, in the Korean Intellectual Property Office, the disclosure of which is incorporated herein in its entirety by reference.

BACKGROUND

The present invention relates to power demand management, and more particularly, to a server and communication device for predicting electricity cost for a subscriber or a subscriber's home appliance, discounting the purchase and/or rental price of the home appliance by reflecting the estimated electricity cost in the purchase and/or rental price, and controlling the home appliance to reduce power consumption, and a method of managing power usage thereof.

Mobile carriers provide integrated services including a network service and sales service of a mobile phone. Thus, consumers can simultaneously purchase services offering numerous benefits with mobile phone having various functions and/or designs at discounted prices. In particular, after the adoption of smart phones, consumers can enjoy expensive smart phone equipments with a relatively low monthly payment through such integrated services. Accordingly, although mobile phones were recognized only as secondary means of communication at the time of initial introduction, they have become necessary communication means used by most people owing to technological development and increased demand.

However, home appliances other than mobile phones were sold rarely with usage fees which is essential for use of the appliances, e.g., in case of electricity cost for air-conditioners or electric heating appliances. High electricity payment is required for air-conditioners or electric heating appliances depending on usage and consumers are unexpectedly restricted in using those appliances. Moreover, consumers were not able to get numerous benefits, such as a discount on electricity cost or product prices for appliances, through such integrated services.

SUMMARY

This work was supported by the Korea Institute of Energy Technology Evaluation and Planning (KETEP) and the Ministry of Trade, Industry & Energy (MOTIE) of the Republic of Korea (No. 20161210200410).

The present invention provides a method of selling and renting an appliance at a selling price including electricity cost and a method and system for managing the selling and the renting.

The present invention also provides a sales method combining sale or rental of an appliance with a discount on electricity cost based on prediction of power demand and demand response of a user of the appliance and a management system.

According to an aspect of the present invention, there is provided a power demand management system including a plurality of power-prepaid appliances and a power demand management server. Each of the power-prepaid appliances includes an authenticator configured to manage an authentication key, a control setting unit configured to receive a power consumption control signal containing a power reduction amount from the power demand management server and to set control information according to the power reduction amount, and an operation control signal generator configured to generate an operation control signal based on the control information selected by the control setting unit. The power demand management server includes a demand resource allocator configured to allocate the power reduction amount to each of the power-prepaid appliances, a security unit configured to encrypt the power consumption control signal based on the authentication key of each of the power-prepaid appliances, and a reduction manager configured to monitor a reduction in power consumption depending on the power consumption control signal.

The control setting unit may set the control information based on a plurality of items of unit information including setting information, environment information, and power consumption.

The control setting unit may specify current unit information among the plurality of items of unit information based on current setting information and current environment information and may select a plurality of unit information control candidates from among the plurality of items of unit information such that a difference between environment information of the current unit information and environment information of each of the unit information control candidates is within a predetermined tolerance.

The control setting unit may acquire differences between power consumption of the current unit information and power consumption of the unit information control candidates and may select a unit information control candidate from among the unit information control candidates as the control information for a current power-prepaid appliance among the power-prepaid appliances, the selected unit information control candidate giving a difference closest to the power reduction amount among the differences.

The power demand management system may further include a power measuring device connected to at least one power-prepaid appliance among the power-prepaid appliances at a power entry point. The power demand management server may further include a non-intrusive load monitoring (NILM) server configured to separate reduction in power consumption of the at least one power-prepaid appliance from power usage measured by the power measuring device and to transmit the reduction in power consumption to the reduction manager.

According to another aspect of the present invention, there is provided a power demand management server including a demand resource allocator configured to receive a power reduction signal from a server of an electric power producing company, to allocate a target power reduction amount to each of a plurality of power-prepaid appliances based on the power reduction signal, and to generate a power consumption control signal; a security unit configured to encrypt the power consumption control signal based on an authentication key held by each power-prepaid appliance; and a reduction manager configured to monitor an actual reduction in power consumption of the power-prepaid appliance depending on the power consumption control signal.

The power demand management server may further include a power measuring device connected to at least one power-prepaid appliance among the power-prepaid appliances at a power entry point and an NILM server configured to separate reduction in power consumption of the at least one power-prepaid appliance from power usage measured by the power measuring device and to transmit the reduction in power consumption to the reduction manager.

The power demand management server may further include a control setting unit configured to calculate control information based on a plurality of items of unit information including setting information, environment information, and power consumption.

The control setting unit may specify reference unit information among the plurality of items of unit information based on current setting information and current environment information and may select a plurality of unit information candidates from among the plurality of items of unit information such that a difference between environment information of the reference unit information and environment information of each of the unit information candidates is within a predetermined tolerance.

The control setting unit may acquire differences between power consumption of the reference unit information and power consumption of the unit information candidates, may select one unit information candidate from among the unit information candidates, and may calculate setting information of the selected unit information candidate as the control information for a current power-prepaid appliance among the power-prepaid appliances, the selected unit information candidate giving a difference closest to the power reduction amount among the differences.

According to a further aspect of the present invention, there is provided a power-prepaid appliance including a power consumption controller and a communication unit. The power consumption controller includes an authenticator configured to manage an authentication key, a control setting unit configured to receive a power consumption control signal from a power demand management server through the communication unit and to calculate control information based on a power reduction amount according to the power consumption control signal, and an operation control signal generator configured to generate an operation control signal based on the control information generated by the control setting unit.

The control setting unit may calculate the control information based on a plurality of items of unit information including setting information, environment information, and power consumption.

The control setting unit may specify reference unit information among the plurality of items of unit information based on current setting information and current environment information and may select a plurality of unit information candidates from among the plurality of items of unit information such that a difference between environment information of the reference unit information and environment information of each of the unit information candidates is within a predetermined tolerance.

The control setting unit may acquire differences between power consumption of the reference unit information and power consumption of the unit information candidates, may select one unit information candidate from among the unit information candidates, and may calculate setting information of the selected unit information candidate as the control information for a current power-prepaid appliance among the power-prepaid appliances, the selected unit information candidate giving a difference closest to the power reduction amount among the differences.

BRIEF DESCRIPTION OF THE DRAWINGS

Embodiments of the present invention will be more clearly understood from the following detailed description taken in conjunction with the accompanying drawings in which.

DETAILED DESCRIPTION OF THE EMBODIMENTS

Hereinafter, the principles of the inventive concept will be explained by describing some embodiments, and therefore, those skilled in the art will be able to invent various apparatuses realizing the inventive concept without departing from the spirit and scope of the present invention, even though these apparatuses will not be clearly described or illustrated below. The terminology and embodiments set forth herein should be considered in descriptive sense only and not for purposes of limitation.

The objectives, features, and merits of the inventive concept will be clearer from the detailed description below, so that those skilled in the art will be able to easily realize the inventive concept.

In the description of the inventive concept, when the detailed description of the known technology in the related art may blur the gist of the inventive concept, the detailed description will be omitted. Hereinafter, embodiments of the inventive concept will be described with reference to the accompanying drawings.

A server, a communication device, and a communication system which have a power demand management function according to some embodiments of the present invention and a method of managing power demand thereof will be described below with reference to FIGS. 1A through 3.

Figure 1A:
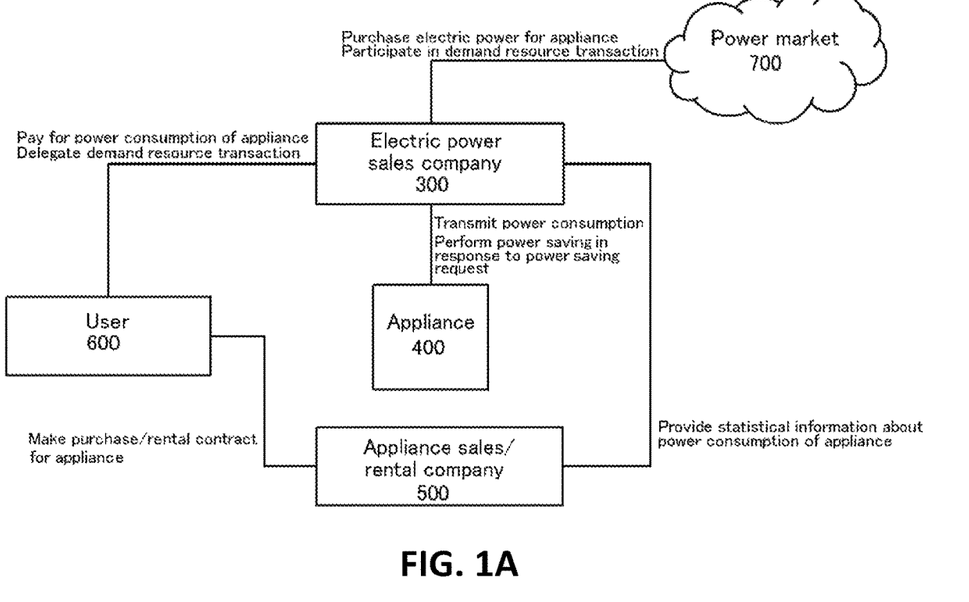
FIGS. 1A and 1B are diagrams for explaining a usage of a system having a power demand management function according to some embodiments of the present invention.
Figure 1B:
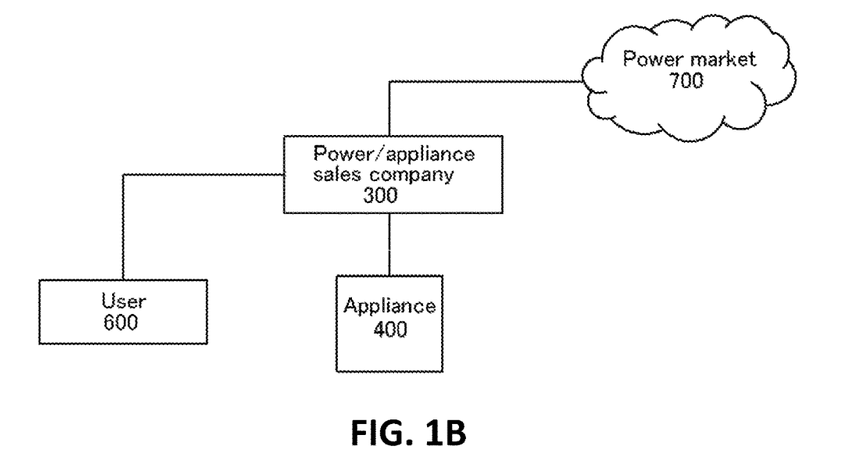
Figure 2:
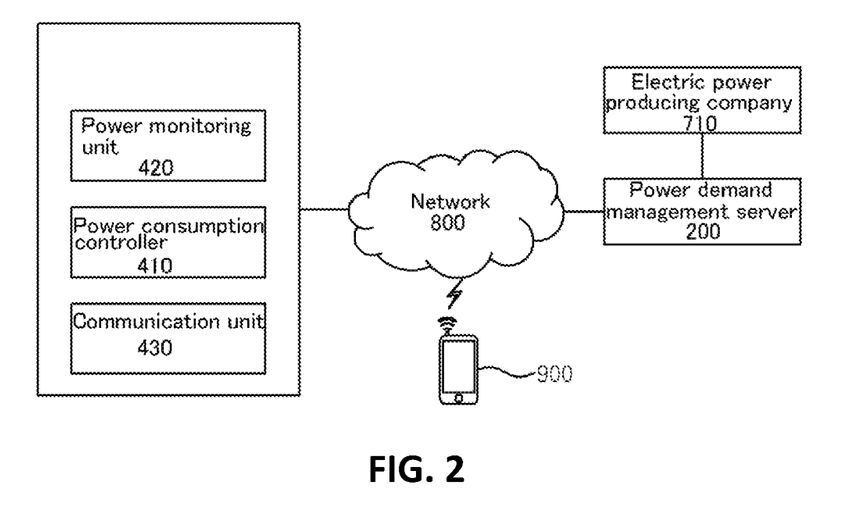
FIG. 2 is a diagram of the structure of a power demand management system according to some embodiments of the present invention.
Figure 3:
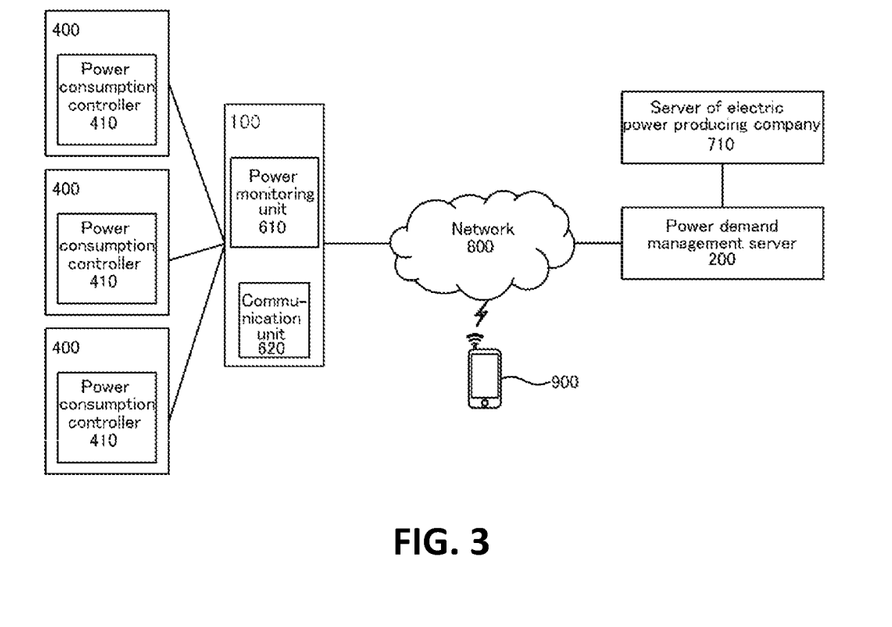
FIG. 3 is a diagram of the structure of a power demand management system according to other embodiments of the present invention.

FIGS. 1A and 1B are diagrams for explaining the application of a system having a power demand management function according to some embodiments of the present invention. FIGS. 2 and 3 are diagrams of the structures of power demand management systems according to some embodiments of the present invention.

The application of a system having a power demand management function according to some embodiments of the present invention will be described first with reference to FIGS. 1A and 1B.

An electric power sales company 300 is a company which sales electric power produced by an electric power producing company (710 in FIG. 2) or sales surplus power in one region to consumers of another region where there is shortage of power production. The electric power sales company 300 deals with electric power in a power market 700 such as a power exchange. The electric power sales company 300 purchases electric power for appliances in the power market 700 in advance and participates in a demand resource transaction requested by the power market 700. The demand resource transaction is for reducing power demand through a demand response at the request of the power market 700 or the electric power producing company 710.

A user 600 may prepay the amount of estimated power consumption of an appliance 400 to the electric power sales company 300 when purchasing the appliance 400 and delegate a demand resource transaction to the electric power sales company 300. During the demand resource transaction, the electric power sales company 300 may acquire control authority over the appliance 400 base on the delegation. Hereinafter, the appliance 400 of which the estimated power consumption is prepaid for when the appliance 400 is purchased is referred to as the power-prepaid appliance 400.

Meanwhile, an appliance sales/rental company 500 sells and rents the power-prepaid appliance 400. The appliance sales/rental company 500 provides statistical information about power consumption of the power-prepaid appliance 400 to the electric power sales company 300. The appliance sales/rental company 500 also makes a sales/rental contract for the power-prepaid appliance 400 with the user 600 and provides the power-prepaid appliance 400 to the user 600.

For example, the appliance sales/rental company 500 may provide the electric power sales company 300 with statistical information about power-consumption-per-unit-time W, recommended use period T, and an electric power amount Q usually reducible in response to a request for power demand reduction in a demand resource transaction, with respect to the power-prepaid appliance 400.

The electric power sales company 300 calculates an additional power usage price P by converting the estimated power consumption of the power-prepaid appliance 400 on sale into the amount of money. The electric power sales company 300 also calculates expected revenue R which can be gained through a demand resource transaction and calculates a final additional price, i.e., DP=P−R.

However, when the electric power sales company 300 has information about power use pattern of the user 600, the electric power sales company 300 may use the final additional price DP obtained based on the user's power use pattern information apart from the general statistical information.

Although the appliance sales/rental company 500 and the electric power sales company 300 are described as separate companies in the current embodiments, they may be one company in other embodiments, as shown in FIG. 1B.

Meanwhile, the user 600 purchases the power-prepaid appliance 400 at a price corresponding to the sum of an original sales price and the final additional price DP. When the additional power usage price P is higher than a certain level and the revenue R is higher than 0 when the final additional price DP is calculated, the user 600 may make a basic agreement on the demand resource transaction with the electric power sales company 300. The agreement is about delegating control authority over power consumption of the power-prepaid appliance 400 to the electric power sales company 300 for a predetermined time period.

The electric power sales company 300 may obtain information about the amount of power actually consumed by the power-prepaid appliance 400 used by the user 600 (hereinafter, referred to as "actual power consumption information") through a power monitoring unit (420 in FIG. 2). Alternatively, the electric power sales company 300 may be informed of the actual power consumption information by a power measuring device (100 in FIG. 3) installed at the entry point of a home electric power and a non-intrusive load monitoring (NILM) server (250 in FIG. 4) of a power demand management server (200 in FIG. 2).

When the user 600 pays an electricity bill, the user 600 makes a payment excluding a payment made in advance for electric power for the power-prepaid appliance 400. Electric power actually consumed by the power-prepaid appliance 400 may be reduced from the electric power purchased in advance by the electric power sales company 300 in a forward electric market or may be purchased by the electric power sales company 300 in a real-time market on behalf of the user 600.

When the electric power sales company 300 receives a power reduction signal from the power market 700 and the electric power producing company 710, the electric power sales company 300 transmits a reduction command to the power-prepaid appliance 400 through a home appliance communication unit and the power-prepaid appliance 400 controls power consumption thereof according to an output control algorithm of a power consumption controller (410 in FIG. 2).

FIG. 2 is a diagram of the structure of a system for realizing the application illustrated in FIG. 1, according to some embodiments of the present invention.

Referring to FIG. 2, the power demand management server 200 is used by the electric power sales company 300 shown in FIGS. 1A and 1B to manage prepaid/actually-consumed power and a demand resource transaction with respect to the power-prepaid appliance 400.

According to some embodiments of the present invention, a power demand management system includes the power demand management server 200 and the power-prepaid appliance 400, as shown in FIG. 2.

The power demand management server 200 receives a power reduction signal from the power market 700 or a server of the electric power producing company 710 and performs demand resource reduction by controlling the power-prepaid appliance 400, which has been purchased by a user, through a network 800 such as the Internet. The operation of the power demand management server 200 is described in detail below.

The power-prepaid appliance 400 may include the power consumption controller 410, the power monitoring unit 420, and a communication unit 430.

Figure 6:
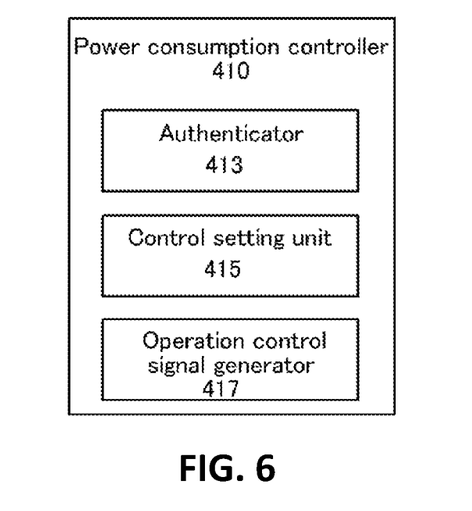
FIG. 6 is a diagram of the structure of a power consumption controller according to some embodiments of the present invention.

Referring to FIG. 6, the power consumption controller 410 may include an authenticator 413, a control setting unit 415, and an operation control signal generator 417. The power consumption controller 410 may receive an authentication request signal and authenticate the power demand management server 200 and the server of the electric power producing company 710. The power consumption controller 410 may also receive a control signal from the power demand management server 200 and control power consumption of the power-prepaid appliance 400.

In detail, the authenticator 413 verifies whether the power demand management server 200 has control authority to authenticate the power demand management server 200. When the authenticator 413 receives an authentication request signal from the power demand management server 200 at initial connection to the power demand management server 200, the authenticator 413 may issue an authentication key to the power demand management server 200 and may grant the control authority to the power demand management server 200 holding the authentication key. Although the power-prepaid appliance 400 authenticates the power demand management server 200 in the current embodiments, the power demand management server 200 may issue the authentication key to the power-prepaid appliance 400 in other embodiments.

The authenticator 413 may perform authentication on the power demand management server 200 as follows.

1) The server of the electric power producing company 710 requests control authority over the power-prepaid appliance 400 from the power demand management server 200.

2) The power demand management server 200 may transmit an authentication request signal to the power-prepaid appliance 400 in response to the control authority request and receive a response signal including the approval of the user 600 from the power-prepaid appliance 400. Alternatively, the power demand management server 200 may receive a response signal including approval for granting the control authority through a user terminal 900 linked with the power-prepaid appliance 400.

3) After receiving the response signal, the power demand management server 200 may generate and transmit an authentication key to the authenticator 413 of the power-prepaid appliance 400. Alternatively, the power demand management server 200 may receive an authentication key from the authenticator 413 of the power-prepaid appliance 400.

The power demand management server 200 may store and manage an authentication key, a model name of the power-prepaid appliance 400, user identification (ID), a use region, the user's contract term (or an authentication period), etc.

4) The power demand management server 200 stores the appliance information (i.e., the user ID, the appliance model name, the use region, etc.) in the server of the electric power producing company 710. Thereafter, the server of the electric power producing company 710 transmits a control request to the power demand management server 200 based on user information which has been stored in the server of the electric power producing company 710.

When the control setting unit 415 receives a power consumption control signal including a power reduction amount, the control setting unit 415 may calculate a way of reducing the power consumption of the power-prepaid appliance 400 such that the power consumption is decremented by the power reduction amount within a predetermined time period.

Hereinafter, the control operation of the control setting unit 415 according to some embodiments of the present invention will be described in detail.

When the control setting unit 415 receives a power consumption control signal including a power reduction amount, the control setting unit 415 may calculate the reduction of power consumption of what resource in the power-prepaid appliance 400 enables the power consumption of the power-prepaid appliance 400 to be decremented by the power reduction amount within a predetermined time period. The control setting unit 415 may calculate power consumption of an individual appliance as follows.

1) The control setting unit 415 stores setting information, environment information, and power information regarding the power-prepaid appliance 400 at a predetermined interval. The setting information, the environment information, and the power information may be stored in memory of the control setting unit 415 or in the power demand management server 200. Alternatively, the control setting unit 415 may store the setting information, the environment information, and the power information whenever the setting is changed. The setting information, the environment information, and the power information are stored as unit information.

For example, when the power-prepaid appliance 400 is an air-conditioner, the power-prepaid appliance 400 may store a set temperature and an operating mode as the setting information, may store humidity, wind speed, and a date as the environment information, and may store power consumption per unit time under such setting and environment as the power information.

2) When the control setting unit 415 receives a power consumption control signal (or a power reduction amount D) from the power demand management server 200, the control setting unit 415 searches the stored information for unit information the most similar to current setting and environment and specifies the unit information as current unit information P_1.

At this time, that the current unit information is "the most similar to the current setting and environment" may mean that when setting information of the current unit information is scored, a difference between the scored value of the setting information of the current unit information and each of scored values of setting information of other unit information stored or a difference (e.g., a temperature difference) between environment information of the current unit information and environment information of other unit information is obtained, and weighted summation is performed on the differences, for example, the current unit information gives the least weighted sum.

3) The control setting unit 415 selects items of unit information $Q\_1, \ldots, Q\_i, \ldots, Q\_N$ as unit information control candidates among a plurality of items of unit information. At this time, a difference between the environment information of the current unit information P_1 and environment information of each of the unit information items Q_1 through Q_N is within a predetermined tolerance and the unit information items Q_1 through Q_N have lower power consumption than the current unit information P_1. For clarity of the description, the unit information control candidate Q_1 is assumed to have the least power consumption among the unit information control candidates Q_1 through Q_N.

At this time, when a unit information control candidate having the lower power consumption than the current unit information P_1 does not exist or when a value obtained by reducing the power consumption of the unit information control candidate Q_1 from the power consumption of the current unit information P_1 is less than the target power reduction amount D, the control setting unit 415 controls the power-prepaid appliance 400 to be turned off or to operate in minimum power mode.

4) The control setting unit 415 obtains a difference between the power consumption of the current unit information P_1 and the power consumption of each of the unit information control candidates Q_1 through Q_N and finds the unit information control candidate Q_i that gives the difference closest to the power reduction amount D.

Although the control setting unit 415 is included in the power-prepaid appliance 400 in the current embodiments, the control setting unit 415 may be included in the power demand management server 200 in other embodiments.

When the control setting unit 415 is included in the power demand management server 200, the power demand management server 200 may allocate a power reduction amount included in a power reduction signal to a control target, i.e., the power-prepaid appliance 400, in response to the power reduction signal from the server of the electric power producing company 710 and perform the above-described operation on the power reduction amount.

The operation control signal generator 417 may generate an operation control signal for actually controlling the operation of the power-prepaid appliance 400 according to a control signal generated by the control setting unit 415.

Referring to back to FIG. 2, the power monitoring unit 420 may monitor electric power actually consumed by the power-prepaid appliance 400 after the above-described control. The power monitoring unit 420 is included in the power-prepaid appliance 400 in the embodiments illustrated in FIG. 2, but the power monitoring unit 420 may be included in the power measuring device 100 installed at the power entry point of a house or a building as shown in FIG. 3. In conjunction with the NILM server 250, the power measuring device 100 may detect power consumption of an individual appliance based on total home energy measured at the power entry point. In other words, the power monitoring unit 420 may detect and monitor the power consumption of the power-prepaid appliance 400 in total power consumption through the power entry point by using the power measuring device 100 and the NILM server 250.

The communication unit 430 is a communication interface, such as a WiFi interface or a local area network (LAN) interface, providing communication between the power-prepaid appliance 400 and the power demand management server 200. The power-prepaid appliance 400 may communicate with the power demand management server 200 through the communication unit 430 and the network 800, e.g., the Internet.

Figure 4:
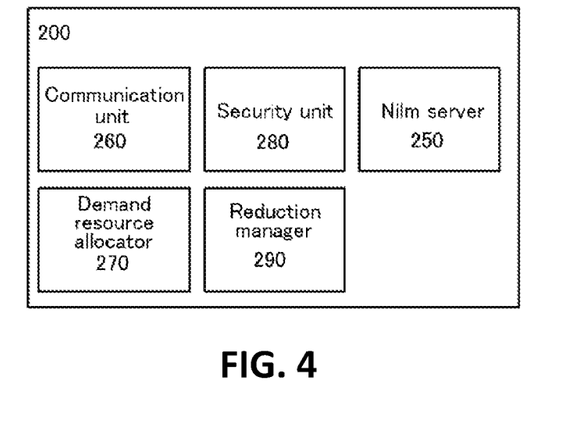
FIG. 4 is a diagram of the structure of a power demand management server according to some embodiments of the present invention.
Figure 5:
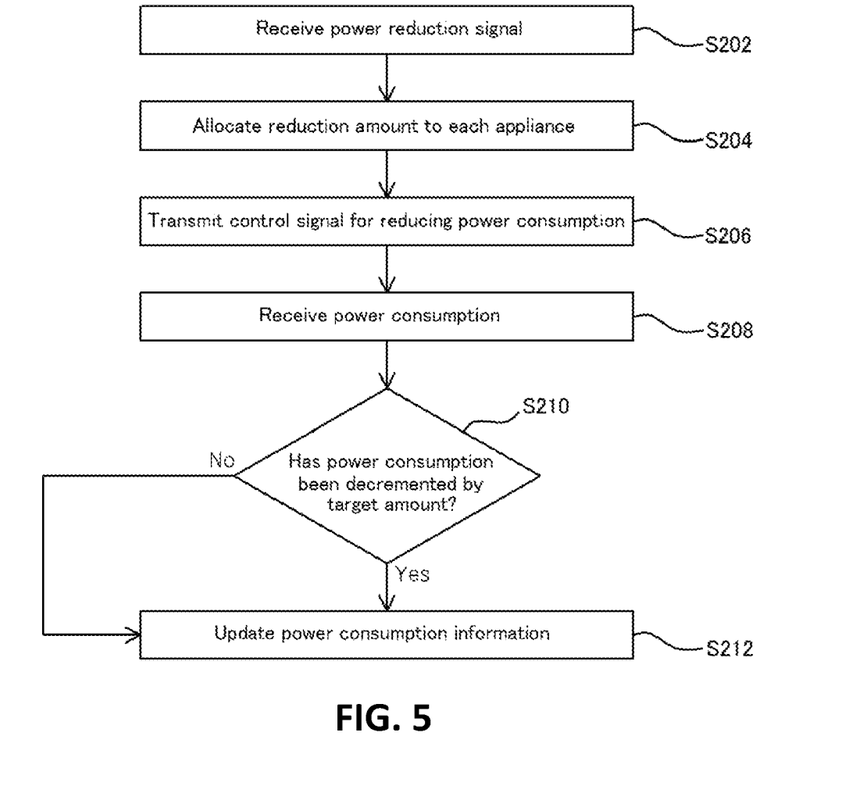
FIG. 5 is a flowchart of the operation of a power demand management server, according to some embodiments of the present invention.

Hereinafter, the structure and operation of the power demand management server 200 according to some embodiments of the present invention will be described with reference to FIGS. 4 and 5.

The power demand management server 200 includes a communication unit 260, a demand resource allocator 270, a security unit 280, and a reduction manager 290. In a case where the power demand management server 200 checks actual power consumption of the power-prepaid appliance 400 through the power measuring device 100, the power demand management server 200 may also include the NILM server 250.

The communication unit 260 is provided for communication among the server of the electric power producing company 710, the power-prepaid appliance 400, the power measuring device 100, and the user terminal 900.

The demand resource allocator 270 may select the power-prepaid appliance 400 to participate in a demand resource transaction. In detail, the demand resource allocator 270 allocates a power reduction amount to each power-prepaid appliance 400, i.e., a target of the demand resource transaction, based on a power reduction signal from the server of the electric power producing company 710. The demand resource allocator 270 also generates a control signal for controlling the power-prepaid appliance 400 to operate according to the allocated power reduction amount.

The security unit 280 manages an authentication key of each power-prepaid appliance 400, encrypts a control signal generated by the demand resource allocator 270, and transmits the encrypted control signal to the power-prepaid appliance 400 through the communication unit 260.

After the control signal is transmitted to the power-prepaid appliance 400, the reduction manager 290 may monitor actual power consumption of the power-prepaid appliance 400 through the power monitoring unit 420. The actual power consumption is monitored in order to calculate a difference between estimated power consumption and actual power consumption of the power-prepaid appliance 400 and to revise the estimated power consumption and the power reduction amount allocated to the power-prepaid appliance 400 later.

The NILM server 250 detects power consumption of the power-prepaid appliance 400 in power consumption measured by the power measuring device 100. Operations between the NILM server 250 and the power measuring device 100 will be described below.

Hereinafter, the operation of the power demand management server 200 according to some embodiments of the present invention will be described with reference to FIG. 5.

The power demand management server 200 receives a power reduction signal from the power market 700 or the server of the electric power producing company 710 in operation S202.

At this time, the power reduction signal may include a total amount of power reduced by the power demand management server 200 and a list of power-prepaid appliances 400, i.e., targets of reduction, or may include a power reduction amount of each power-prepaid appliance 400 targeted for reduction.

The power demand management server 200 allocates a power reduction amount to each power-prepaid appliance 400 in operation S204 and transmits a control signal corresponding to the power reduction amount to the power-prepaid appliance 400 in operation S206. At this time, the control signal may be encrypted using an authentication key.

The power-prepaid appliance 400 operates to reduce power consumption according to the control signal. After the reduction of power consumption, the power demand management server 200 may receive the actual amount of the reduction of power consumption from the power-prepaid appliance 400 or the power monitoring unit 420 in operation S208. The power demand management server 200 may check whether the power consumption of the power-prepaid appliance 400 has been decremented by the allocated power reduction amount in operation S210. When actual power reduction is excessive or deficient, the power demand management server 200 may reflect the excess or deficiency in operation S212 when generating a control signal next time. In other words, the power demand management server 200 may update power consumption information.

According to the above-described structure, when an appliance is sold or rented, electricity cost for the appliance is included in a total payment on the appliance, so that a user does not need to pay for the electricity cost after purchasing/renting the appliance. Accordingly, the appliance is more competitive than other companies' products not having the function presented herein. Moreover, an electric power sales company may purchase electric power at lower price in a wholesale power market by predicting power consumption of a particular appliance and purchasing in large quantities.

Hereinafter, the power measuring device 100 at a power entry point and the NILM server 250 which generates power information by labeling a data set received from the power measuring device 100 will be described with reference to FIGS. 7 through 12.

Figure 7:
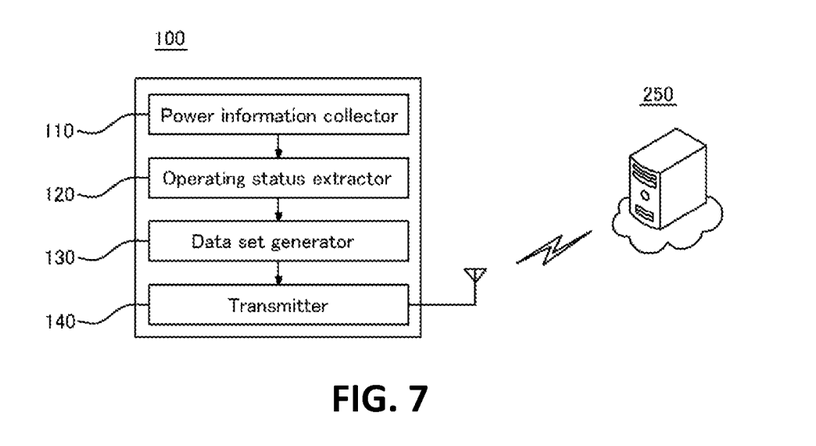
FIG. 7 is a block diagram of a power measuring device according to some embodiments of the present invention.

FIG. 7 is a block diagram of the power measuring device 100 at a power entry point, according to some embodiments of the present invention.

The power measuring device 100 performs a hardware algorithm to generate an unregistered load clustering data set in order to estimate energy consumption of an individual energy appliance connected to the power entry point and energy consumption of an internal component of the energy appliance from total energy consumption at the power entry point and transmits the unregistered load clustering data set to the power demand management server 200.

In other words, the power measuring device 100 is installed together with a single sensor at the power entry point and is loaded with a series of hardware algorithms for measuring total energy consumption and estimating energy consumption of an individual load device. Information pre-processing performed on a load device by the hardware algorithms is summarized as follows.

First, a snapshot is extracted from a signal of voltage or current, a reference point is extracted, and noise filtering is performed on the snapshot using the reference point. Normal or transient status of voltage, active power, reactive power, etc. is detected based on the result of the noise filtering. Operating status, such as an on or off event, of a load device and an operating status change thereof are extracted based on the detected normal or transient status. A final clustering data set is generated by pattern matching load classification based on voltage-current correlation, high-frequency distortion, current or power snapshot signal deformation, active/reactive power correlation, etc. related to load characteristics. The clustering data set is compressed and transmitted to a particular server or cloud in an unregistered status (e.g., with a load classification mark such as 1, 2, 3, A, B, or C) which cannot be recognized by a user.

The power measuring device 100 is described in detail with reference to FIG. 7 from now on. Referring to FIG. 7, the power measuring device 100 includes a power information collector 110, an operating status extractor 120, a data set generator 130, and a transmitter 140.

The power information collector 110 collects power information including a power signal from at least one power entry point for a plurality of load devices.

A load device may be a device or component using electric energy. A power entry point is a node, through which power is input for a plurality of load devices, such as a power entry point of a panel board or distributing board of a household. The operation of the power information collector 110 will be described in detail with reference to FIG. 8 below.

Figure 8:
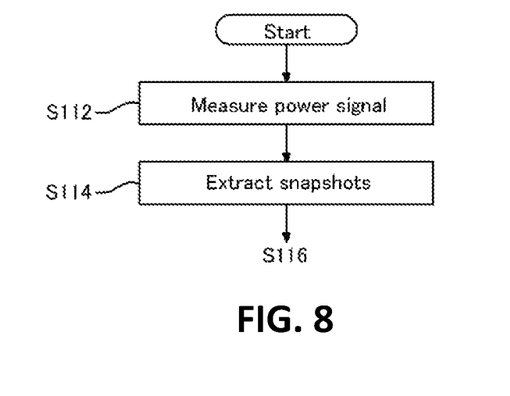
FIGS. 8 through 10 are flowcharts of the operation of the power measuring device, according to some embodiments of the present invention.

The power information collector 110 measures a power signal in operation S112. In detail, raw power information waveforms of current and voltage are measured using an energy meter and a single sensor which are installed at the power entry point.

Thereafter, the power information collector 110 extracts snapshots in operation S114. In detail, snapshots of alternating current (AC) waveform voltage or current having a predetermined cycle are collected. In the current embodiments, a snapshot of a single cycle AC waveform voltage and a snapshot of high-frequency current are preferably extracted.

Thereafter, the operating status extractor 120 detects normal or transient status of power change from the collected voltage or power information and extracts operating status of the load device or a change pattern of the operating status. This will be described in detail with reference to FIG. 9 below.

Figure 9:
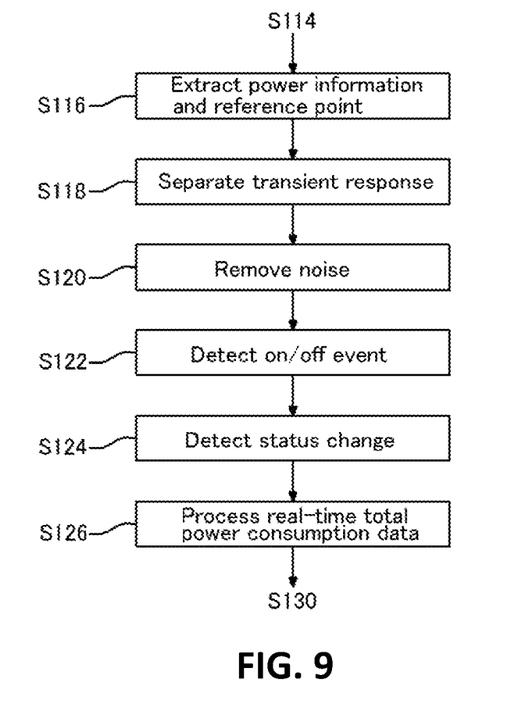

Referring to FIG. 9, the operating status extractor 120 extracts power information and a reference point in operation S116. In other words, the operating status extractor 120 extracts real-time power consumption and power quality information and extracts the reference point for distinguishing the normal status from the transient status.

In the current embodiments, the reference point is the amount of power which is constantly used without fluctuation and is continuously turned on without being turned on and off in the load device through the extraction of the real-time power consumption and the power quality information.

Thereafter, the operating status extractor 120 separates a transient response in operation S118. In detail, the operating status extractor 120 extracts a transient interval, during which on or off occurs or the operating status is changed due to the operation of the load device, from the power consumption.

The operating status extractor 120 removes noise in operation S120. In detail, the operating status extractor 120 removes a meaningless high-frequency noise signal generated in the measurement of the power signal of total power consumption.

The operating status extractor 120 classifies the snapshot according to the extracted operating status or the extracted change pattern of the operating status. For example, a snapshot may have much higher snapshot extraction frequency when the transient response is detected than in the normal status.

Referring back to FIG. 9, the operating status extractor 120 detects an on or off event in operation S122. In detail, the operating status extractor 120 classifies snapshots of events by on or off status of each of load devices before clustering of the load devices.

The operating status extractor 120 detects a status change in operation S124. In detail, the operating status extractor 120 detects and classifies change patterns of the operating status of the load devices having multiple phases apart from the on/off operation or a continuous change characteristic.

The operating status extractor 120 processes real-time total power consumption data in operation S126. In detail, the operating status extractor 120 calculates and stores power information data and generates a transmission data packet, with respect to total energy consumption and power quality information for real-time electric energy information service.

Thereafter, the data set generator 130 generates a data set, which matches the operating status or the change pattern of the operating status, for each load device based on signal correlation depending on power usage characteristics of the load device. This will be described in detail with reference to FIG. 10 below.

Figure 10:
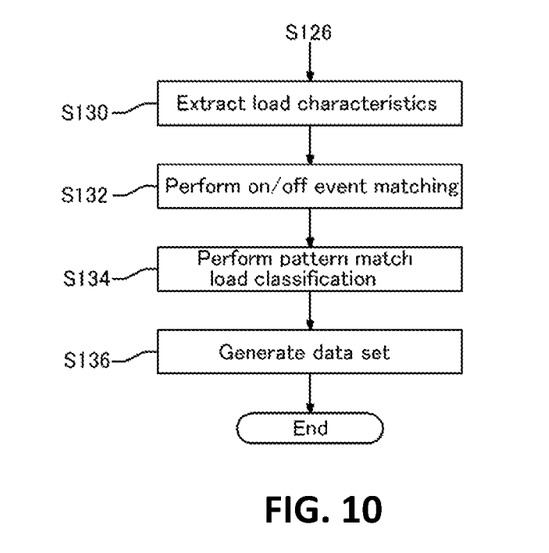

Referring to FIG. 10, the data set generator 130 extracts load characteristics in operation S130.

The data set generator 130 generates signal correlation, which reflects the power usage characteristics of each load device, using the snapshot, the transient response, the on/off event, and the status change information extracted from total power consumption data. The signal correlation may include voltage-current correlation, high-frequency distortion, current or power snapshot signal deformation, and active/reactive power correlation.

Thereafter, the data set generator 130 performs on/off event matching in operation S132 and pattern matching load classification in operation S134 in order to generate a data set.

In detail, the data set generator 130 classifies the on and off events of each load device as a pair for one device based on the signal correlation in operation S132 and classifies the multiple phases or continuous change characteristic into an association group with the on and off events for one device based on the signal correlation in operation S134.

The data set generator 130 generates a data set in operation S136. In detail, the data set generator 130 generates a data set which corresponds to the association group obtained through the on/off event matching and the pattern matching load classification.

Figure 11:
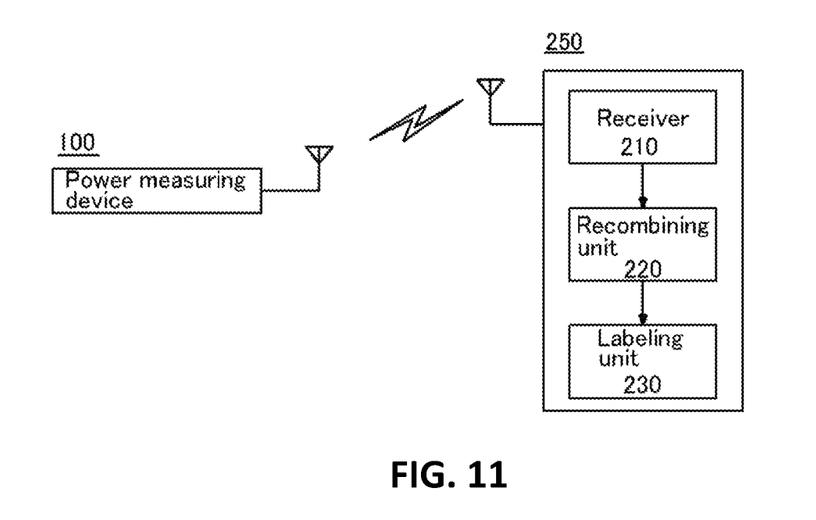
FIG. 11 is a block diagram of a non-intrusive load monitoring (NILM) server according to some embodiments of the present invention.

The transmitter 140 transmits the data set to the NILM server 250, which recombines data sets and generates labeled power information.

Before the data set is transmitted, a data packet generated by the energy meter may be compressed such that a large amount of data can be easily transmitted to a particular server.

Power consumption and quality information data required for the real-time electric energy information service may also be transmitted together with the data set.

A snapshot extraction (i.e., power signal sampling) frequency and information processing efficiency depending thereon will be described in detail with reference to FIGS. 8 through 10.

It is important that the power information collector 110 sets a snapshot extraction frequency appropriately. When a snapshot extraction frequency is lower than a specific value, for example, when the snapshot extraction frequency is less than one per second, resolution of the transient interval of a load device is low, so that it is difficult to distinguish the load device from other load devices. When the snapshot extraction frequency is higher than a specific value, for example, when the snapshot extraction frequency is several thousands to several tens of thousands per second, the resolution of the transient interval is excessively high, so that an error such as recognizing one load device as a different one may occur. Accordingly, a snapshot extraction frequency appropriate for efficient information pre-processing of an energy meter at a power entry point is 10 to 900 per second.

Thereafter, efficient information processing after operating status extraction can be accomplished through snapshot classification performed by the operating status extractor 120. For example, although 15 snapshots are always extracted per second in operation S114, only one of 15 snapshots or only 15 representative values are selectively classified when there is no change in operating status and all 15 snapshots are selected when a change in the operating status is detected, so that the resolution of the transient interval only is separately increased. In other words, the resolution of the transient interval essential to the analysis of energy use information of each device is increased and data traffic related burden is decreased (for example, even in a case where the transmitter 140 periodically transmits data once per second, the transmitter 140 transmits selectively classified one snapshot or one representative value calculated using measurement by division when there is no change in operating status and transmits 15 snapshots at a time in the transient interval), so that matching between the energy meter and the server is enhanced. Accordingly, the on/off event extraction (S122), the status change detection (S124), and some or all operations performed by the data set generator 130 may be performed through the server.

Hereinafter, the NILM server 250 which receives a data set from the power measuring device 100 and generates labeled power information according to some embodiments of the present invention will be described with reference to FIG. 11 below.

The NILM server 250 may perform machine learning and automatic labeling based on a clustering data set for each load and a data set of real-time power consumption and power quality information and may provide energy usage information and energy saving tip consulting to a user at a power entry point. In other words, the NILM server 250 may be a mass data processing device which processes total energy information and each load device's energy information received from the energy meter and generates and provides various energy saving solutions and consulting for the user.

In detail, the NILM server 250 performs information post-processing using software algorithms. The processing includes reclassifying an unregistered load clustering data set in a multi-dimensional plane of reference domains such as active power, reactive power, and time and setting classification boundaries in a load device through machine learning for classification by components or particular operations such as on/off, multi-phase, continuous change, and constant activation.

The classification is completed by mapping the recombined data set to the development of real-time power consumption in time domain. Sub-components of the load device are grouped into one load device which can be recognized by the user (for example, by way of 1+2+3 or A+B+C). Thereafter, automatic labeling is performed by matching the load device to a registered data set (of, for example, refrigerator, washing machine, air-conditioner, etc.) which has been stored in advance.

At this time, labeling is performed manually with respect to a load device, on which the automatic labeling has not been performed due to data not existing in the registered data set, by means of, for example, manually turning on and off the load device and checking the on and off times. The manually generated data is added to the registered data set and used in automatic labeling afterwards.

Referring to FIG. 11, the NILM server 250 includes a receiver 210, a recombining unit 220, and a labeling unit 230.

The receiver 210 receives a data set generated by classifying power information based on components forming a load device.

The recombining unit 220 recombines data sets by reclassifying the data sets in a multi-dimensional plane according to operating characteristics of each load device and mapping the reclassified data sets to a time domain.

Before the recombining, the recombining unit 220 may decompress data in operation S202. In other words, when the power measuring device 100 at a power entry point transmits compressed data, the compressed data may be decompressed in order to increase the execution speed of a software algorithm.

The recombining unit 220 recombines components of the load device by mapping the reclassified data to the development of power usage in time domain. This will be described in detail with reference to FIG. 12 below.

Figure 12:
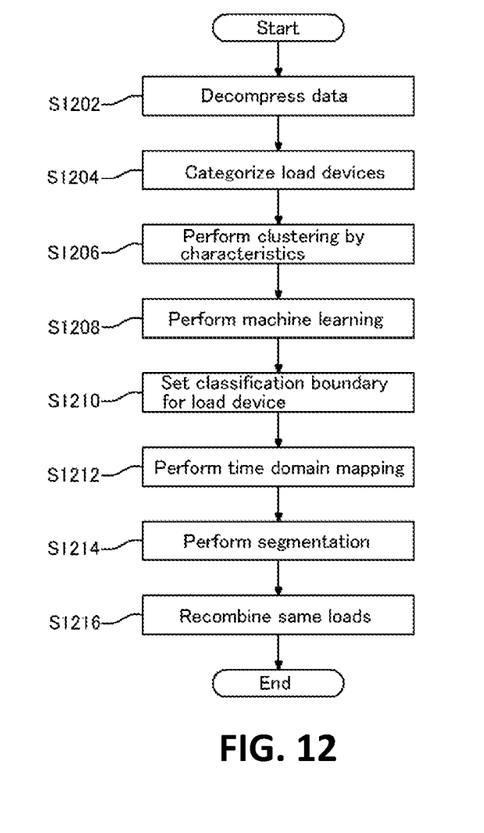
FIG. 12 is a flowchart of the operation of the NILM server, according to some embodiments of the present invention.

FIG. 12 is a flowchart of the operation of the recombining unit 220, according to some embodiments of the present invention.

Referring to FIG. 12, the recombining unit 220 categorizes load devices in operation S1204. In detail, the recombining unit 220 defines a distribution plane according to the operating characteristics (e.g., on/off, multi-phase, continuous change, and constant activation) of individual load devices determined as the same device.

The recombining unit 220 performs clustering by characteristics in operation S1206. In detail, the recombining unit 220 reconstructs the multi-dimensional plane by associating the clustering data set with the categorization so that a boundary is easily set in the distribution plane. When the multi-dimensional plane is reconstructed, active power, reactive power, time, etc. may be reference regions.

After the reconstruction of the multi-dimensional plane, machine learning is performed in operation S1208. In detail, the recombining unit 220 generates a classification reference for a boundary between operations or components of each load device using a clustering result for the load devices and a machine learning method based on a status identifying algorithm such as an artificial intelligence network. The recombining unit 220 sets a classification boundary for a load device in operation S1210. In detail, the recombining unit 220 reclassifies data by performing load segmentation with respect to the clustering data at an individual component level using the machine learning boundary classification reference. At this time, unregistered detailed load classification is determined down to the component level with respect to the individual load devices from total electric energy.

Thereafter, the recombining unit 220 performs time domain mapping in operation S1212. In detail, the recombining unit 220 maps a data set for unregistered components reclassified through the above-described process to real-time data in time domain.

Segmentation is performed in operation S1214. In detail, recombining unit 220 segments the mapped data down to the component level using various colors or a display method which can be recognized by a user.

Thereafter, the recombining unit 220 recombines the same loads in operation S1216. In detail, the recombining unit 220 generates a group, as a load device which can be recognized by the user, by combining sub-components generated during the segmentation for the load device. For example, compressor, motor, lamp and control circuit characteristics generated during the segmentation are combined and grouped into refrigerator. At this time, unregistered temporary marks such as 1, 2, and 3 and A, B, and C are used internally.

After the recombining, the labeling unit 230 labels the recombined data set. For example, the labeling unit 230 automatically matches unregistered and temporarily marked data classified as a load device with the name of a corresponding load device in conjunction with the registered load device data set stored in advance. For instance, A, B, C, or the like may be automatically registered as a refrigerator, a television (TV), a washing machine, or the like through a matching algorithm between a data pattern and stored data.

Labeling may also be performed manually. In detail, a developer or a user names a load device and inputs the name of the load device when the load device has been unregistered because it has not matched registered load device data in the automatic labeling. A method of using on and off times of the load device is available.

Data about load devices manually labeled may be separately stored together with the registered data, so that the registered load device data set can be expanded.

Furthermore, the NILM server 250 may provide data analysis information using energy usage information of the individual load devices. In other words, data analysis based on a behavioral psychology analysis algorithm may be applied to total electric energy and energy usage pattern of each load device to generate a specific data set.

In addition, expert consulting tips for users to save energy may be automatically generated through the data analysis.

It is also possible to provide an integrated service providing total electric energy, energy usage of each load device, energy saving consulting, etc. to a specific building and a unit household through an energy information technology (IT) provider.

As an example of energy consulting, it is possible to detect a change in a set of clustering data segmented at a component level with respect to the status of each load device, to determine aging or failure status of the components of the load device, and to provide the determination result to a user.

According to the embodiments described above, power consumption information of each of components of various kinds of load devices may be extracted by performing a combination of a hardware algorithm of a power measuring device and a software algorithm of a server with respect to total power consumption information at a power entry point.

In addition, since a software algorithm of a server is flexibly combined in a single power measuring device, detailed and accurate power consumption information of each load device is extracted without a burden of high cost for installing a system including multiple devices, so that a high-end energy saving scheme can be derived. In particular, it is possible to acquire power usage information higher than a branch circuit level without adopting multiple sensors in a distribution board.

In summary, according to embodiments of the present invention, in extracting power usage information of each load device front total power usage information measured at a power entry point, a specific server does not perform all algorithms, but a power measuring device and a server operate in a dual system such that the power measuring device performs information preprocessing and a hardware algorithm and generates a clustering data set and the server performs information post-processing, a software algorithm, and labeling and generates energy saving tips. In other words, a single power measuring device may perform information preprocessing to achieve a resolution enabling distinction between components and a server may store data, analyze a pattern, and utilize the data, so that flexibility can be ensured for processing, storing and management of mass data about power usage of various kinds of load.

According to embodiments of the present invention, when a power-prepaid appliance is sold or rented, electricity cost for the power-prepaid appliance is included in a total payment on the power-prepaid appliance, so that a user of the power-prepaid appliance does not need to pay for the electricity cost after purchasing/renting the power-prepaid appliance. Accordingly, the power-prepaid appliance is more competitive than other appliances not having the function presented herein. Moreover, a electric power sales company may purchase electric power at lower price in a wholesale power market by predicting power consumption of power-prepaid appliances and purchasing them in large quantities.

In addition, power consumption of appliances can be temporarily lowered using demand resource transaction authority over the appliances when necessary, so that power can be traded as demand resources in a power market.

Moreover, a user can get various benefits including a discount on electricity cost when purchasing a power-prepaid appliance.

While the present invention has been particularly shown and described with reference to exemplary embodiments thereof, it will be understood by those of ordinary skill in the art that various changes in form and details may be made therein without departing from the spirit and scope of the present invention as defined by the following claims.

The embodiments should be considered in descriptive sense only and not for purposes of limitation. Therefore, the scope of the present invention is defined not by the detailed description of the invention but by the appended claims, and all differences within the scope will be construed as being included in the present invention.

What is claimed is:

1. A power demand management system comprising:
   a plurality of power-prepaid appliances; and
   a power demand management server,
   wherein each of the power-prepaid appliances comprises:
      an authenticator which manages an authentication key;
      a control setting unit which receives a power consumption control signal containing a power reduction amount from the power demand management server and to set control information according to the power reduction amount; and
      an operation control signal generator which generates an operation control signal based on the control information selected by the control setting unit, and
   the power demand management server comprises:
      a memory for storing during an authentication period in which each user of each of the power-prepaid appliances delegates a control authority to the electric power sales company, wherein each of the power-prepaid appliances is controlled based on the control authority;
      a demand resource allocator which allocates the power reduction amount to each of the power-prepaid appliances in the authentication period and generate the power consumption control signal containing the power reduction amount in the authentication period;
      a security unit which encrypts the power consumption control signal based on the authentication key of each of the power-prepaid appliances and send the power consumption control signal to each of the power-prepaid appliances; and
      a reduction manager which monitors a reduction in power consumption depending on the power consumption control signal;
   wherein the control setting unit sets the control information based on a plurality of items of unit information comprising setting information, environment information, and power consumption; and
   wherein the control setting unit specifies current unit information among the plurality of items of unit information based on current setting information and current environment information and selects a plurality of unit information control candidates from among the plurality of items of unit information such that a difference between environment information of the current unit information and environment information of each of the unit information control candidates is within a predetermined tolerance.

2. The power demand management system of claim 1, wherein the control setting unit acquires differences between power consumption of the current unit information and power consumption of the unit information control candidates and selects a unit information control candidate from among the unit information control candidates as the control information for a current power-prepaid appliance among the power-prepaid appliances, the selected unit information control candidate giving a difference closest to the power reduction amount among the differences.

3. The power demand management system of claim 1, further comprising a power measuring device connected to at least one power-prepaid appliance among the power-prepaid appliances at a power entry point,
   wherein the power demand management server further comprises a non-intrusive load monitoring (NILM) server configured to separate reduction in power consumption of the at least one power-prepaid appliance from power usage measured by the power measuring device and to transmit the reduction in power consumption to the reduction manager.

4. A power demand management server comprising:
   a memory for storing during an authentication period in which each user of each of the power-prepaid appliances delegates a control authority to the electric power sales company, wherein each of the power-prepaid appliances is controlled based on the control authority;
   a demand resource allocator which receives a power reduction signal from a server of an electric power producing company, to allocate a target power reduction amount to each of a plurality of power-prepaid appliances in the authentication period based on the power reduction signal, and to generate a power consumption control signal containing the power reduction amount in the authentication period;
   a security unit which encrypts the power consumption control signal based on an authentication key held by each power-prepaid appliance and send the power consumption control signal to each of the power-prepaid appliances;
   a reduction manager which monitors an actual reduction in power consumption of the power-prepaid appliance depending on the power consumption control signal; and
   a control setting unit which controls control information based on a plurality of items of unit information comprising setting information, environment information, and power consumption;
   wherein the control setting unit specifies reference unit information among the plurality of items of unit information based on current setting information and current environment information and selects a plurality of unit information candidates from among the plurality of items of unit information such that a difference between environment information of the reference unit information and environment information of each of the unit information candidates is within a predetermined tolerance.

5. The power demand management server of claim 4, further comprising:
   a power measuring device connected to at least one power-prepaid appliance among the power-prepaid appliances at a power entry point; and
   a non-intrusive load monitoring (NILM) server configured to separate reduction in power consumption of the at least one power-prepaid appliance from power usage measured by the power measuring device and to transmit the reduction in power consumption to the reduction manager.

6. The power demand management server of claim 4, wherein the control setting unit acquires differences between power consumption of the reference unit information and power consumption of the unit information candidates, selects one unit information candidate from among the unit information candidates, and calculates setting information of the selected unit information candidate as the control information for a current power-prepaid appliance among the power-prepaid appliances, the selected unit information candidate giving a difference closest to the power reduction amount among the differences.

7. A power-prepaid appliance comprising:
a power consumption controller; and
a communication unit,
wherein the power consumption controller comprises:
- an authenticator which manages an authentication key;
- a control setting unit which receives a power consumption control signal from a power demand management server through the communication unit and to calculate control information based on a power reduction amount according to the power consumption control signal, wherein the power demand management server comprises:
- a memory for storing during an authentication period in which each user of each of the power-prepaid appliances delegates a control authority to the electric power sales company, wherein each of the power-prepaid appliances is controlled based on the control authority;
- a demand resource allocator which allocates the power reduction amount of the power-prepaid appliances in the authentication period and generate the power consumption control signal containing the power reduction amount in the authentication period; and
- a security unit which encrypts the power consumption control signal based on the authentication key of each of the power-prepaid appliances and send the power consumption control signal to each of the power-prepaid appliances; and
- an operation control signal generator which generates an operation control signal based on the control information generated by the control setting unit;
wherein the control setting unit calculates the control information based on a plurality of items of unit information comprising setting information, environment information, and power consumption; and
wherein the control setting unit specifies reference unit information among the plurality of items of unit information based on current setting information and current environment information and selects a plurality of unit information candidates from among the plurality of items of unit information such that a difference between environment information of the reference unit information and environment information of each of the unit information candidates is within a predetermined tolerance.

8. The power-prepaid appliance of claim 7, wherein the control setting unit acquires differences between power consumption of the reference unit information and power consumption of the unit information candidates, selects one unit information candidate from among the unit information candidates, and calculates setting information of the selected unit information candidate as the control information for a current power-prepaid appliance among the power-prepaid appliances, the selected unit information candidate giving a difference closest to the power reduction amount among the differences.

* * * * *